W. S. BICKLEY.
TESTING APPARATUS.
APPLICATION FILED NOV. 22, 1910.
987,667.
Patented Mar. 21, 1911.
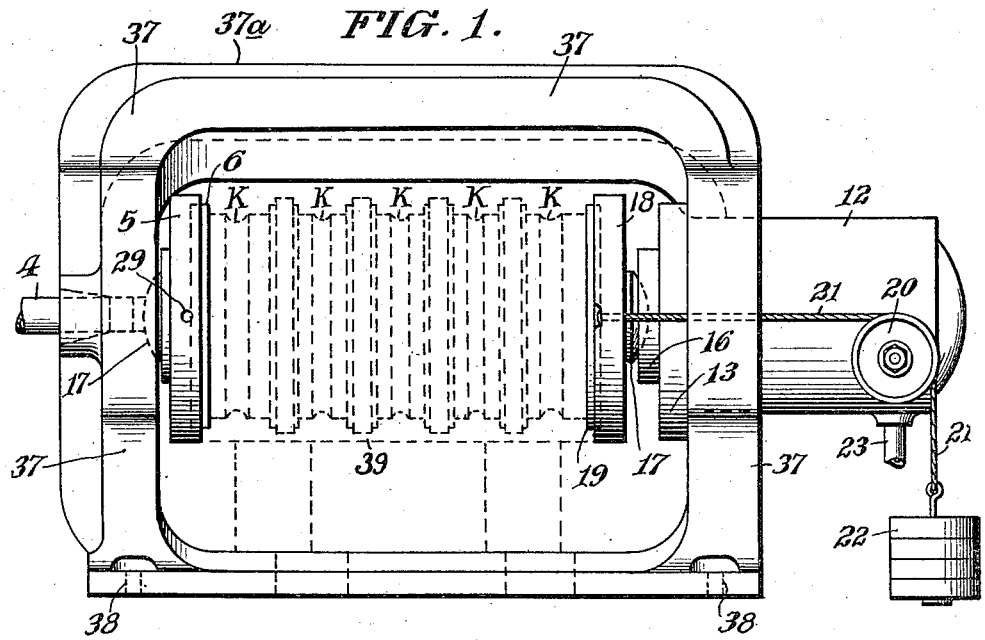
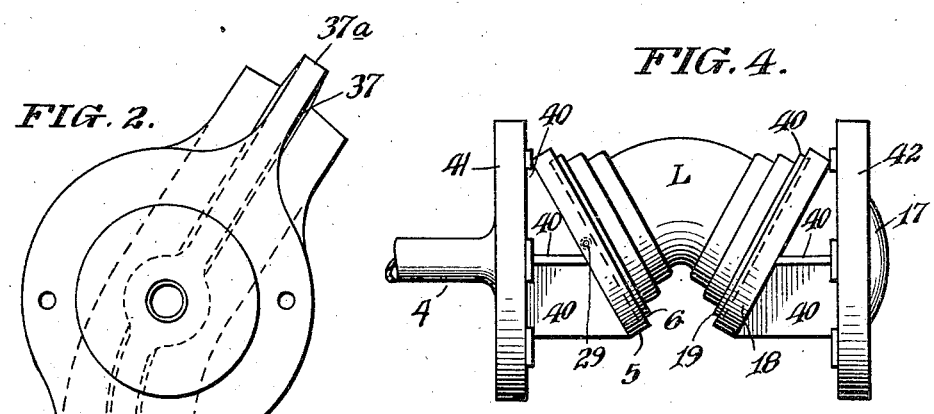
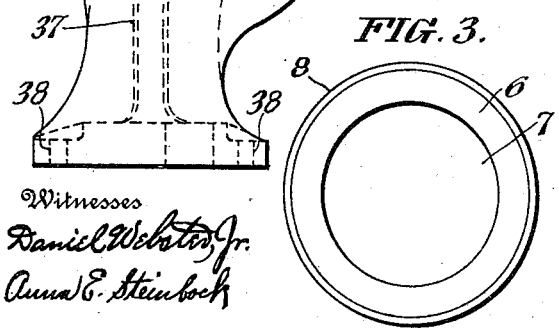
Witnesses
Daniel Webster, Jr.
Anna E. Steinbock
Inventor
Walter S. Bickley
by Cornelia L. Eliet
his Attorney

UNITED STATES PATENT OFFICE.

WALTER S. BICKLEY, OF CHESTER, PENNSYLVANIA, ASSIGNOR TO PENN STEEL CASTING AND MACHINE COMPANY, A CORPORATION OF PENNSYLVANIA.

TESTING APPARATUS.

987,667.     Specification of Letters Patent.     Patented Mar. 21, 1911.

Original application filed January 4, 1910, Serial No. 536,250. Divided and this application filed November 22, 1910. Serial No. 593,616.

*To all whom it may concern:*

Be it known that I, WALTER S. BICKLEY, a citizen of the United States, and resident of the city of Chester, in the county of Delaware, State of Pennsylvania, have invented certain new and useful Improvements in Testing Apparatus, of which the following is a specification.

My invention relates to testing apparatus, and particularly to apparatus for testing vessels, pipes, or other containers subjected to gaseous, fluid or liquid pressures.

My invention resides in apparatus for holding during test a member or series of members to be tested, such as pipe joints, couplings, unions, etc., or any other suitable vessel or device, and relates particularly to such apparatus for testing under high fluid, liquid or gaseous pressure pipe couplings, joints, unions, etc., made of cast iron, cast steel, or other material.

More particularly my invention resides in apparatus such as above referred to, which comprises a frame or housing adapted to be secured upon its one side to a floor or other suitable base and its top portion laterally deflected, so that the test piece or pieces may be easily inserted in position for test.

For an illustration of one of the forms my invention may take, reference is to be had to the accompanying drawing, in which:

Figure 1 is a side elevational view of my testing apparatus. Fig. 2 is an end elevational view of the same. Fig. 3 is a plan view of a wooden or other buffer or block suitable for use in my apparatus. Fig. 4 is a side elevational view of modified rest pieces suitable for testing pipe elbows or pipe joints of certain types.

In Figs. 1 and 2, I have shown a form of apparatus suitable for testing a plurality of simple pipe couplings or other vessels or devices such, for example, as K, K, shown in dotted lines. The housing or frame 37 has a stiffening rib 37ª and may be secured to a floor or other suitable base at 38, 38. At its one end it is provided with a cylinder 12 extending through an opening in the end of housing 37 and having a flange 13 engaging the inner side of the housing. Within the cylinder is disposed a piston 16 which may be moved inwardly by fluid or other medium under pressure supplied through pipe 23. A rest piece 18 has a spherically-shaped portion 17 adapted to bear in a concavity in the piston 16 to allow pivotal or adjusting movement of the piece 18 with respect to the piston 16. Attached to the rest piece 18 on each side of the cylinder 12 are ropes, cords, or other suitable devices 21 running over the sheaves or pulleys 20 and carrying the weights 22 which retract the rest piece and piston after a test has been completed. Opposite the rest piece 18 is the rest piece 5 having a stem 4 extending freely through a perforation in the housing 37, the rest piece 5 having a spherically-shaped portion 17 to allow pivotal movement of the piece 5 with respect to the housing 37. A port 29 in the rest piece 5 communicates with the central aperture of the rest piece which, in turn, communicates with the interior of the test devices K, K, such port being connected to the source of fluid or other pressure by which the test is made. A block 19, which may be unperforated, is adapted to rest in a depression in the rest piece 18. And in a depression in the rest piece 5 is adapted to fit the wooden block or ring 6, shown in Fig. 3, provided with a reinforcing band or hoop 8, and having an internal aperture 7 communicating with the port 29 and with the interior of the devices K, K.

A single member to be tested or a plurality of devices K, K may be assembled on a suitable board or rack with blocks of wood or other suitable material 39 intervening between neighboring devices K, K, each block 39 being provided with a perforation so that when placed in the apparatus as shown in Fig. 1, the interiors of all the devices K, K are in communication with each other. Upon admitting pressure from the pipe 23 to the cylinder 12, the piston 16 advances and clamps all the devices or the single device snugly against the rest piece 5 in the position shown. Then air, gas, fluid or liquid is admitted under pressure through the pressure pipe 29 and the devices subjected to necessary test.

As seen in Fig. 2, the frame 37 has its upper portion, particularly that portion above the axis, deflected to one side, so that a crane or other transferring device bearing the board or crate or the test piece or pieces, may lower the same downwardly into position without engaging any part of the frame, which, however, acts as the necessary support or member for taking the strain of the tests.

As seen in Fig. 4, the pipe coupling or joint L having its ends at an angle to each other, as shown, may be subjected to test. Here, the rest pieces 5 and 18 are supported by webs 40 integral with or upon the members 41 and 42, respectively. The member 41 has a stem 4 to extend through the frame or housing 37. And the member 42 has the pivotal bearing projection 17 against which pressure is exerted by the piston, such as 16. When in position, a block or brace may be placed upon the top of the pipe coupling L and extend between the same and the frame 37 to prevent the elbow or device L being forced out of position. When securely clamped, pressure is admitted through pipe 29, as heretofore described.

This application is a division from my prior application Serial No. 536,250, filed January 4, 1910.

What I claim is:

1. In testing apparatus, a housing having a horizontal portion adapted to be secured to a base or floor, vertical end portions, a pressure cylinder and an opposing rest piece supported by said vertical end portions, said end portions extending above the axis of said rest piece and cylinder and deflected to one side, and a portion integrally joining the tops of said end portions to one side of the housing axis.

2. In testing apparatus, the combination with a housing, of means for securing the same in operative position, a rest piece supported by said housing, a pressure cylinder supported by said housing opposite said rest piece, said housing extending from its securing means and deflecting laterally from the axis of said cylinder.

3. In testing apparatus, the combination with a housing, a pressure cylinder supported thereby, a rest piece engaging said housing, the axis of said cylinder being horizontal, and said housing deflecting laterally from a position vertically above said axis.

In testimony whereof I have hereunto affixed my signature in the presence of the two subscribing witnesses.

WALTER S. BICKLEY.

Witnesses:
WILLIAM F. BAKER,
SENN BOOTH.

---

Copies of this patent may be obtained for five cents each, by addressing the "Commissioner of Patents, Washington, D. C."